US005716434A

United States Patent [19]

Koyama

[11] Patent Number: 5,716,434

[45] Date of Patent: Feb. 10, 1998

[54] NON-ERASABLE PENCIL LEAD

[75] Inventor: Takao Koyama, Tano-gun, Japan

[73] Assignee: Mitsubishi Pencil Kabushiki Kaisha, Tokyo, Japan

[21] Appl. No.: 690,128

[22] Filed: Jul. 31, 1996

[30] Foreign Application Priority Data

Aug. 29, 1995 [JP] Japan .................................... 7-220252

[51] Int. Cl.$^6$ .................................................... C09D 13/00

[52] U.S. Cl. ...................................... 106/31.11; 106/31.96

[58] Field of Search ................................ 106/19 B, 19 E, 106/31.11, 31.96

[56] References Cited

U.S. PATENT DOCUMENTS

| | | | |
|---|---|---|---|
| 2,273,935 | 2/1942 | Chesler | 106/19 B |
| 2,566,752 | 9/1951 | Van Dusen et al. | 106/19 B |
| 5,318,622 | 6/1994 | Kitazawa et al. | 106/19 B |
| 5,595,700 | 1/1997 | Kitazawa | 106/19 B |

FOREIGN PATENT DOCUMENTS

| | | |
|---|---|---|
| 52-70619 | 6/1977 | Japan . |
| 60-264296 | 12/1985 | Japan . |

*Primary Examiner*—Helene Klemanski
*Attorney, Agent, or Firm*—Darby & Darby

[57] ABSTRACT

Provided is a non-erasable pencil lead for a natural pencil and a mechanical pencil, characterized in that the pores of a baked pencil lead are impregnated with an unsaturated compound containing an unsaturated group having an iodine value of at least 130 or more, wherein an antioxidant, an oxidative polymerization catalyst and/or a photosensitizer can be added in addition to the unsaturated compound.

12 Claims, No Drawings

NON-ERASABLE PENCIL LEAD

BACKGROUND OF THE INVENTION (1) Field of the Invention

The present invention relates mainly to a pencil lead for a natural pencil and a mechanical pencil, specifically to a non-erasable pencil lead that the lines drawn with the pencil lead are not erased with an eraser.

(2) Description of the Related Art

A technique by which lines drawn with a pencil lead are made unerasable (against an eraser) is, for example, the method disclosed in Japanese Patent Application Laid-Open No. 52-70619 (1977). In the method, a pencil lead is filled in the pores thereof with a photocurable resin, and after writing with the lead, the drawn lines are irradiated with light energy of a short wavelength such as UV rays to cure the resin, thereby making the drawn lines non-erasable.

However, this method has the defect that it cannot be widely applied since an apparatus for irradiating with short wavelength rays such as UV rays is needed for constituting the mechanism displaying non-erasability described above.

Further, a color-developing pencil lead in which the pores thereof are impregnated with a dye and a color aid is known as well as colored pencil lead (Japanese Patent Application Laid-Open No. 60-264296).

This color-developing pencil lead has a coloring mechanism in which the drawn lines remain even after erased with an eraser since the dye, which is a color former, is fixed on paper after drawing. This involves the defects that the density of the drawn lines remaining on the paper after erased with an eraser depends on the amount of the colorant contained in the pores of the pencil lead and that since the pores of the pencil lead have generally small volume and therefore can not hold therein a sufficiently large amount of a colorant, the drawn lines can not have sufficiently high densities. Further, involved therein are the defects that a color of the drawn lines remaining after erased with an eraser depends on a color of the dye after color development and therefore deviates from a color the pencil lead is to have intrinsically and that the remaining drawn lines have low light fastness and are poorly waterproof in some dyes.

SUMMARY OF THE INVENTION

An object of the present invention is to provide a non-erasable pencil lead that the lines drawn with the pencil lead remain even after erased with an eraser. The present invention does not have the defects that the conventional techniques described above have had. That is, it does not need to employ measures such as irradiating the lines with high energy rays in order to fix the lines on paper after drawing, or alternatively to fix dyes for drawn lines.

Intensive investigations were made by the present inventors in order to solve the problems described above. While noting that some unsaturated compounds having unsaturated groups readily induce oxidative polymerization by oxygen in the air, it is found that lines drawn with a pencil lead obtained by impregnating the pores of the pencil lead with at least one of unsaturated compounds containing unsaturated groups having an iodine value of 130 or more remain even after attempts to erase with an eraser.

The non-erasable pencil lead of the present invention is composed of the following components (1) to (5):

(1) a non-erasable pencil lead characterized by that the pores of a baked pencil lead are impregnated with an unsaturated compound containing an unsaturated group having an iodine value of at least 130 or more, (2) a non-erasable pencil lead as described in the above (1), wherein the unsaturated compound described above comprises at least one selected from unsaturated fatty acid, unsaturated fatty acid ester, unsaturated fatty acid glyceride and natural drying oil containing a plurality of them, and synthetic drying oils such as fractional drying oil, copolymerized drying oil, polyhydric alcohol fatty acid ester, dehydrated castor oil, dehydrated castor oil fatty acid and conjugate isomerized oil, (3) a non-erasable pencil lead as described in the above (1) or (2), wherein an antioxidant is added to the unsaturated compound described above, (4) a non-erasable pencil lead as described in any of the above (1) to (3), wherein an oxidative polymerization catalyst is added to the unsaturated compound described above, and (5) a non-erasable pencil lead as described in any of the above (1) to (4), wherein a photosensitizer absorbing near visible rays and near UV rays is added to the unsaturated compound described above.

As follows are the details of a mechanism by which the lines drawn with the non-erasable pencil lead of the present invention are made non-erasable against an eraser.

Writing with the non-erasable pencil lead of the present invention causes the lead to be abraded on a writing face, thereby fixing abraded powder (drawn line) containing an unsaturated compound on the writing face. This drawn line can readily be erased with an eraser during some time after writing, but as time passes, the unsaturated compound is oxidatively polymerized by oxygen in the air to cause hardening gradually, whereby the abraded powders strongly bond with each other and with the writing face lines to be made non-erasable against an eraser.

The fastness can be enhanced by adding an antioxidant to the unsaturated compound.

Further, the time for inducing non-erasability can be shortened by adding an oxidative polymerization catalyst or a photosensitizer accelerating the oxidative polymerization by turning oxygen into singlet oxygen having higher energy by light, particularly visible and near visible or near UV rays, to the unsaturated compound.

The non-erasable pencil lead of the present invention makes it possible to readily obtain drawn lines which are non-erasable against an eraser, using oxygen in the air without a specific ray generator used for conventional non-erasable pencil leads charged with photocurable resins. Further, the non-erasability thereof makes it possible to use the non-erasable pencil lead of the present invention in writing tools for official documents and reserved documents in the same manner as to ball point pens and felt tip pens.

DETAILED DESCRIPTION OF THE PREFERRED EMBODIMENTS

The present invention will be explained below in detail.

The present invention is characterized in that the pores of a baked pencil lead are impregnated with an unsaturated compound containing an unsaturated group having an iodine value of at least 130 or more.

In the present invention, the "unsaturated compound" means a compound having a carbon-carbon double bond or triple bond in a molecule.

The unsaturated compound containing an unsaturated group having an iodine value of at least 130 or more used in the present invention includes drying oils, and examples thereof include natural drying oils such as red currant oil, hemp-seed oil, thistlseed oil, false flax oil, linseed oil, Japanese plum yew oil, perilla oil, oiticica oil, candlenut oil, walnut oil, poppy seed oil, safflower oil, Chinese tung oil, soybean oil, soybean germ oil, tobacco seed oil, Korea pine seed oil, niger seed oil, Japanese tung oil, sunflower seed oil, henbane seed oil, grape nucleus oil, pine seed oil, sardine oil, codfish oil and herring oil, unsaturated fatty acids such as eleostearic acid, linolenic acid, palinalinic acid, arachidonic acid and octadecadienoic acid, and the derivatives thereof such as eaters, glycerides and acid anhydrides, fractional drying oils, copolymerized drying oils such as oil modified with maleic acid, oil modified with styrene and oil modified with urethane, and synthetic drying oils such as (unsaturated)polyhydric alcohol fatty acid esters, dehydrated castor oil, dehydrated castor oil fatty acids, boiled oils, stand oils, and conjugate isomerized oils. These unsaturated compounds can be used singly or in a mixture of two or more kinds thereof.

A mixture of the preceding unsaturated compound having an iodine value of at least 130 with oil & fat having an iodine value of less than 130 and an organic solvent can be used as well, and the oil & fat and the organic solvent can be mixed in a blend amount of 100 weight parts or less based on 100 weight parts of the unsaturated compound having an iodine value of at least 130 or more.

An antioxidant is added to the unsaturated compound described above in order to improve the preservability. It can be added in an amount of 0.0001 to 1 weight part, preferably 0.02 to 0.1 weight part based on 100 weight parts of the unsaturated compound. The addition amount falling in the above range of 0.0001 to 1 weight part can improve the preservability further more than in the case where the unsaturated compound is used alone.

There can be used as the antioxidant, for example, antioxidants for oil & fats, such as dibutylhydroxytoluene, dl-α-tocopherol, nordihydroguialetic acid, flavonoid, butylhydroxy-anisole and propyl gallate, radical chain inhibitors including phenol series antioxidants such as 2,6-di-t-butyl-p-cresol and 2,2'-methylenebis(4-methyl-6-butylphenol), and peroxide decomposing agents such as sulfur series antioxidants and phosphorous series antioxidants.

An oxidative polymerization catalyst is added to the unsaturated compounds in order to shorten the time for developing non-erasability. It can be added in an amount of 0.001 to 1 weight part, preferably 0.01 to 0.7 weight parts based on 100 weight parts of the unsaturated compound. The addition amount falling in the above range of 0.001 to 1 weight part can shorten of the time for developing non-erasability further more than the unsaturated compound alone.

The oxidative polymerization catalyst may be fatty acid salts of metals selected from cobalt, manganese, lead, calcium, zirconium, zinc, iron, vanadium and rare earth elements. Examples include manganese naphthenate, cobalt naphthenate, lead naphthenate, lead octylate, cobalt octylate, zirconium naphthenate, calcium naphthenate, cerium octylate, lanthanum octylate, and iron naphthenate.

A photosensitizer is added to the unsaturated compounds described above in order to shorten the time for developing non-erasability as is the case with the oxidative polymerization catalyst. It can be added in an amount of 0.01 to 20 weight parts, preferably 0.1 to 10 weight parts based on 100 weight parts of the unsaturated compound. The addition amount falling in the above range of 0.01 to 20 weight parts can shorten the time for developing non-erasability further more than the unsaturated compound alone.

Dyes absorbing near visible rays and near UV rays can be used as the photosensitizer and include, for example, compounds having maximum absorption wavelengths at 400 to 700 nm, such as rose bengal, erythrocin, methylene blue, chlorophyll, hematoporphyrin and zinc tetraphenylporphin, and picramide, p,p'-dimethylaminobenzophenone, p,p'-tetramethyldiaminobenzophenone, 1,2-benzoanthraquinone, 3-methyl-2-keto-1,3-diaza-1,4-benzoanthrone and 4,4'-bis-(diethylamino)benzophenone. In addition to the above, pigments such as $TiO_2$ and ZnO and natural dyes can be used.

In the non-erasable pencil lead of the present invention, a pencil lead is first produced by the following conventional production processes.

Conventional processes for producing pencil leads are classified largely into a production process of a clay type and a carbon type. In the production of the clay type, after blending and kneading inorganic fillers such as graphite, boron nitride, talc, mica and carbon black with clay, surfactants and water as a plasticizer, the kneaded product is molded and is baked at high temperatures to obtain a baked body. In the production of the carbon type, after blending and kneading the inorganic fillers described above with synthetic resins, natural resins, pitches such as asphalt, plasticizers and lubricants, the kneaded product is molded and is baked in a non-oxidative atmosphere of 800° to 1400° C. to carbonize the resins, whereby a baked body containing carbon as a binder is obtained.

In general, pores are present in the pencil lead of the clay type or the carbon type thus produced, and in conventional pencil leads, these pores are impregnated with oil & fats to increase the density of drawn lines and smoothen the writing.

The pencil lead of the present invention can be produced by impregnating the pores of a pencil lead produced by the conventional method described above with the unsaturated compound containing an unsaturated group having an iodine value of 130 or more, or with said unsaturated compound added at least one of the antioxidant, the oxidative polymerization catalyst and the photosensitizer absorbing near visible rays and near UV rays, each described above.

A method for impregnating the pencil lead with the compound having an iodine value of 130 or more includes, for example, a method in which the pencil lead is immersed in an impregnating solution comprising the above unsaturated compound and then subjected to the impregnating treatment in a closed system so that the unsaturated compound does not contact the air. Preferred is a method in which a closed system is purged with dry inert gas before subjecting the pencil lead to the impregnating treatment and then the pores of the pencil lead are impregnated with the unsaturated compound and the like at room temperature and an atmospheric pressure, and more preferred is a method in which the pencil lead is heated and is subjected to the impregnating treatment under reduced pressure or applied pressure, thereby impregnating the pores of the pencil lead with the unsaturated compound and the like.

After finishing the impregnating treatment described above, the pencil lead is drawn up to remove the surplus impregnating solution remaining on the pencil lead surface, whereby the non-erasable pencil lead of the present invention can be obtained.

The non-erasable pencil lead of the present invention thus obtained can be used for writing in the same manner as conventional pencil leads. The drawn lines containing the inorganic filler, the binder and the unsaturated compound as the main components are fixed on a writing face. After a while, oxygen contained in the air readily causes an auto-oxidative polymerization of the unsaturated compound at room temperature to cure the unsaturated compound soon, whereby the inorganic powder and the binder are firmly combined each other and with the paper face. This causes the lead powder constituting the drawn lines to be firmly combined with the paper face and therefore can provide drawn lines having an excellent abrasion resistance which can no longer be easily erased with an eraser.

EXAMPLES

The present invention shall be more fully illustrated below with reference to examples but the present invention shall not be restricted to these examples.

Example 1

A pencil lead baked body of a carbon type having a diameter of 0.5 mm was obtained by kneading graphite, a synthetic resin and a plasticizer, extrusion-molding this kneaded product in a filament form and then baking them at 1000° C. in an inert gas atmosphere.

The pencil lead thus obtained was put in a vessel containing an impregnating solution comprising china wood oil having an iodine value of 150 or more, and then the impregnating solution was shut off from the air to make the system closed. Further, the impregnating solution contained in the closed vessel was heated to 80° C. to subject the pencil lead to impregnating treatment for 24 hours. After finishing the impregnating treatment, the pencil lead was taken out of the vessel, and the surplus impregnating solution remaining on the surface of the pencil lead was wiped off to obtain the non-erasable pencil lead of the present invention.

The non-erasable pencil lead thus obtained could be used for writing in the same manner as conventional pencil leads impregnated with saturated hydrocarbons. The erasability of this pencil lead with an eraser and the preservability thereof are shown in the following Table 1 and Table 2.

Example 2

Graphite was kneaded with the synthetic resin and the plasticizer in the same manner as that in Example 1, and this kneaded product was extruded in a filament form to mold into a pencil lead. Then, the molded pencil lead was baked up to 1000° C. in an inert gas atmosphere, whereby a pencil lead baked body of a carbon type having a diameter of 0.5 mm was obtained.

The pencil lead thus obtained was put into a vessel containing an impregnating solution comprising 50 weight parts of octadecatrienoic acid having an iodine value of 270 and 50 weight parts of α-eleostearic acid having an iodine value of 270, and then the impregnating solution was shut off from the air to make the system closed. Further, after pressurizing the vessel to 30 kg/cm$^2$ with nitrogen gas, the impregnating solution contained in the vessel was heated to 80° C. to subject the pencil lead to the impregnating treatment for 24 hours. After finishing the impregnating treatment, the pencil lead was taken out of the vessel, and the surplus impregnating solution remaining on the surface of the pencil lead was removed with a centrifuge, whereby the non-erasable pencil lead of the present invention was obtained.

The non-erasable pencil lead thus obtained could be used for writing in the same manner as conventional pencil leads impregnated with saturated hydrocarbons. The erasability of this pencil lead with an eraser and the preservability thereof are shown in the following Table 1 and Table 2.

Example 3

Graphite was kneaded with the synthetic resin and the plasticizer in the same manner as that in Example 1, and this kneaded product was extruded in a filament form to mold into a pencil lead. Then, the molded pencil lead was baked up to 1000° C. in an inert gas atmosphere, whereby a pencil lead baked body of a carbon type having a diameter of 0.5 mm was obtained.

The pencil lead thus obtained was put into a vessel containing an impregnating solution comprising 50 weight parts of dehydrated castor oil (DCO: manufactured by Ito Seiyu Co., Ltd.) having an iodine value of 140 or more, 50 weight parts of china wood oil having an iodine value of 150 or more and 0.1 weight part of dl-α-tocopherol as an antioxidant, and then the impregnating solution was shut off from the air to make the system closed. Further, after pressurizing the vessel to 30 kg/cm$^2$ with nitrogen gas, the impregnating solution contained in the vessel was heated to 80° C. to subject the pencil lead to the impregnating treatment for 24 hours. After finishing the impregnating treatment, the pencil lead was taken out of the vessel, and the surplus impregnating solution remaining on the surface of the pencil lead was removed with a centrifuge, whereby the non-erasable pencil lead of the present invention was obtained.

The non-erasable pencil lead thus obtained could be used for writing in the same manner as conventional pencil leads impregnated with saturated hydrocarbons. The erasability of this pencil lead with an eraser and the preservability thereof are shown in the following Table 1 and Table 2.

Example 4

Graphite was kneaded with the synthetic resin and the plasticizer in the same manner as that in Example 1, and this kneaded product was extruded in a filament form to mold into a pencil lead. Then, the molded pencil lead was baked up to 1000° C. in an inert gas atmosphere, whereby a pencil lead baked body of a carbon type having a diameter of 0.5 mm was obtained.

The pencil lead thus obtained was put into a vessel containing an impregnating solution comprising 50 weight parts of dehydrated castor oil (DCO-FA: manufactured by Ito Seiyu Co., Ltd.) having an iodine value of 155 or more, 50 weight parts of china wood oil having an iodine value of 150 or more and 0.01 weight part of cobalt naphthenate as an oxidative polymerization catalyst, and then the impregnating solution was shut off from the air to make the system closed. Further, after pressurizing the vessel to 30 kg/cm$^2$ with nitrogen gas, the impregnating solution contained in the vessel was heated to 80° C. to subject the pencil lead to the impregnating treatment for 24 hours. After finishing the impregnating treatment, the pencil lead was taken out of the vessel, and the surplus impregnating solution remaining on the surface of the pencil lead was removed with a centrifuge, whereby the non-erasable pencil lead of the present invention was obtained.

The non-erasable pencil lead thus obtained could be used for writing in the same manner as conventional pencil leads impregnated with saturated hydrocarbons. The erasability of this pencil lead with an eraser and the preservability thereof are shown in the following Table 1 and Table 2.

Example 5

Graphite was kneaded with the synthetic resin and the plasticizer in the same manner as that in Example 1, and this kneaded product was extruded in a filament form to mold into a pencil lead. Then, the molded pencil lead was baked up to 1000° C. in an inert gas atmosphere, whereby a pencil lead baked body of a carbon type having a diameter of 0.5 mm was obtained.

The pencil lead thus obtained was put into a vessel containing an impregnating solution comprising 20 weight parts of dehydrated castor oil (DCO-FA: manufactured by Ito Seiyu Co., Ltd.) having an iodine value of 155 or more, 80 weight parts of china wood oil having an iodine value of 150 or more and 0.01 weight part of 4,4'-bis(diethylamino) benzophenone as a photosensitizer, and then the impregnating solution was shut off from the air to make the system closed. Further, after pressurizing the vessel to 30 kg/cm$^2$ with nitrogen gas, the impregnating solution contained in the vessel was heated to 80° C. to subject the pencil lead to the impregnating treatment for 24 hours. After finishing the impregnating treatment, the pencil lead was taken out of the vessel, and the surplus impregnating solution remaining on the surface of the pencil lead was removed with a centrifuge, whereby the non-erasable pencil lead of the present invention was obtained.

The non-erasable pencil lead thus obtained could be used for writing in the same manner as conventional pencil leads impregnated with saturated hydrocarbons. The erasability of this pencil lead with an eraser and the preservability thereof are shown in the following Table 1 and Table 2.

Example 6

Graphite, clay and a surfactant were blended and kneaded with water, and this kneaded product was extruded in a filament form to mold into a pencil lead. Then, the molded pencil lead was baked up to 1000° C. in a non-oxidative atmosphere, whereby a pencil lead baked body of a clay lead type having a diameter of 2.0 mm was obtained.

The pencil lead thus obtained was put into a vessel containing an impregnating solution comprising 50 weight parts of china wood oil having an iodine value of 150 or more, 50 weight parts of linseed oil having an iodine value of 170 or more and 0.1 weight part of dl-α-tocopherol as an antioxidant, and then the impregnating solution was shut off from the air to make the system closed. The impregnating solution was heated to 80° C. to subject the pencil lead to the impregnating treatment for 24 hours. After finishing the impregnating treatment, the pencil lead was taken out of the vessel, and the surplus impregnating solution remaining on the surface of the pencil lead was removed with a centrifuge, whereby the non-erasable pencil lead of the present invention was obtained.

The non-erasable pencil lead thus obtained could be used for writing in the same manner as conventional pencil leads impregnated with non-volatile oils such as saturated hydrocarbons and silicone oils. The erasability of this pencil lead with an eraser and the preservability thereof are shown in the following Table 1 and Table 2.

Comparative Example 1

Graphite was kneaded with the synthetic resin and the plasticizer in the same manner as that in Example 1, and this kneaded product was extruded in a filament form to mold into a pencil lead. Then, the molded pencil lead was baked up to 1000° C. in an inert gas atmosphere, whereby a pencil lead baked body of a carbon type having a diameter of 0.5 mm was obtained.

The pencil lead thus obtained was put into a vessel containing an impregnating solution comprising castor oil having an iodine value of less than 90, and then the impregnating solution was shut off from the air to make the system closed. Further, after pressurizing the vessel to 30 kg/cm$^2$ with nitrogen gas, the impregnating solution contained in the vessel was heated to 80° C. to subject the pencil lead to the impregnating treatment for 24 hours. After finishing the impregnating treatment, the pencil lead was taken out of the vessel, and the surplus impregnating solution remaining on the surface of the pencil lead was removed with a centrifuge, whereby a non-erasable pencil lead for comparison was obtained.

The non-erasable pencil lead thus obtained could be used for writing in the same manner as conventional pencil leads impregnated with saturated hydrocarbons. The erasability of this pencil lead with an eraser and the preservability thereof are shown in the following Table 1.

Comparative Example 2

Graphite was kneaded with the synthetic resin and the plasticizer in the same manner as that in Example 1, and this kneaded product was extruded in a filament form to mold into a pencil lead. Then, the molded pencil lead was baked up to 1000° C. in an inert gas atmosphere, whereby a pencil lead baked body of a carbon type having a diameter of 0.5 mm was obtained.

The pencil lead thus obtained was put into a vessel containing an impregnating solution comprising 100 weight parts of olive oil having an iodine value of less than 90 and 0.01 weight part of cobalt naphthenate as an oxidative polymerization catalyst, and then the impregnating solution was shut off from the air to make the system closed. Further, after pressurizing the vessel to 30 kg/cm$^2$ with nitrogen gas, the impregnating solution contained in the vessel was heated to 80° C. to subject the pencil lead to the impregnating treatment for 24 hours. After finishing the impregnating treatment, the pencil lead was taken out of the vessel, and the surplus impregnating solution remaining on the surface of the pencil lead was removed with a centrifuge, whereby a non-erasable pencil lead for comparison was obtained.

The non-erasable pencil lead thus obtained could be used for writing in the same manner as conventional pencil leads impregnated with saturated hydrocarbons. The erasability of this pencil lead with an eraser and the preservability thereof are shown in the following Table 1.

Comparative Example 3

Graphite was kneaded with the synthetic resin and the plasticizer in the same manner as that in Example 1, and this kneaded product was extruded in a filament form to mold into a pencil lead. Then, the molded pencil lead was baked up to 1000° C. in an inert gas atmosphere, whereby a pencil lead baked body of a carbon type having a diameter of 0.5 mm was obtained.

The pencil lead thus obtained was put into a vessel containing an impregnating solution comprising 100 weight parts of olive oil having an iodine value of less than 90 and 0.01 weight part of 4,4'-bis(diethylamino)benzophenone as a photosensitizer, and then the impregnating solution was shut off from the air to make the system closed. Further, after pressurizing the vessel to 30 kg/cm$^2$ with nitrogen gas, the impregnating solution contained in the vessel was heated to 80° C. to subject the pencil lead to the impregnating treatment for 24 hours. After finishing the impregnating treatment, the pencil lead was taken out of the vessel, and the surplus impregnating solution remaining on the surface of the pencil lead was removed with a centrifuge, whereby a non-erasable pencil lead for comparison was obtained.

The non-erasable pencil lead thus obtained could be used for writing in the same manner as conventional pencil leads impregnated with saturated hydrocarbons. The erasability of this pencil lead with an eraser and the preservability thereof are shown in the following Table 1.

The erasability with an eraser was expressed in terms of a non-erasing rate. The definition of the non-erasing rate and the measuring method therefor will be explained below.

According to a density wearing test method of JIS Standard, the non-erasing rate has been defined by a ratio of a reflection density in a part erased with an eraser in 10 minutes, 1 hour and 24 hour after drawn to a reflection density of lines drawn on wood free paper (Beck smoothness=60 to 70 seconds) at a drawing load of 300 gf as a blank, that is, by the following equation:

$$\text{Non-erasing rate (\%)} = \frac{\text{reflection density of drawn lines after erased with eraser}}{\text{reflection density of drawn lines before erased with eraser}} \times 100$$

provided that the condition of erasing with an eraser is to rub the drawn lines five times with the eraser at a load of 500 gf, and a reflection density in a part erased with the eraser is determined by measuring a reflection density in a rubbed part.

TABLE 1

| Non-erasing rate | Example | | | | | | Comp. Example | | |
|---|---|---|---|---|---|---|---|---|---|
| after | 1 | 2 | 3 | 4 | 5 | 6 | 1 | 2 | 3 |
| 1 hour | <3.0 | <3.0 | <3.0 | <3.0 | <3.0 | <3.0 | <3.0 | <3.0 | <3.0 |
| 6 hours | 3.5 | 3.5 | 3.5 | 3.5 | 3.5 | 3.5 | <3.0 | <3.0 | <3.0 |
| 24 hours | 10.0 | 10.0 | 4.0 | 15.0 | 30.0 | 10.0 | <3.0 | <3.0 | <3.0 |
| 3 days | 40.0 | 35.0 | 10.0 | 45.0 | 45.0 | 30.0 | <3.0 | <3.0 | <3.0 |
| 1 week | 45.0 | 40.0 | 35.0 | 55.0 | 55.0 | 40.0 | <3.0 | <3.0 | <3.0 |
| 3 weeks | 65.0 | 50.0 | 45.0 | 60.0 | 60.0 | 50.0 | <3.0 | <3.0 | <3.0 |

The preservability was determined by the following method.

The pencil leads of Examples 1 to 6 subjected to the impregnating treatment were left standing in the air, and the initial writing feel and the densities of the drawn lines were compared and judged with the lapse of time by a sensory evaluation.

TABLE 2

| | Example | | | | | |
|---|---|---|---|---|---|---|
| Preservability | 1 | 2 | 3 | 4 | 5 | 6 |
| 6 hours | ◎ | ◎ | ◎ | ◎ | ◎ | ◎ |
| 1 day | ◎ | ◎ | ◎ | ◎ | ◎ | ◎ |
| 3 days | ◎ ~ ○ | ◎ ~ ○ | ◎ | ○ | ○ | ◎ |
| 1 week | ○ | ○ | ◎ | ○ | ○ | ◎ |
| 2 weeks | ○ | ○ | ◎ | Δ | ○ ~ Δ | ◎ |
| 4 weeks | Δ | Δ | ◎ | Δ | Δ | ◎ |

Evaluation criteria:
◎: the same writing feeling and density of drawn lines as initial ones are maintained
○: writing feeling is a little heavier but density of drawn lines is almost maintained
Δ: writing feeling is a little harder and density of drawn lines is a littler lower but writing performance is not affected thereby Consideration on the Results Summarized in Tables 1 & 2

In summary, it has been found that Examples 1 to 6 of the invention are excellent in the non-erasing rate against an eraser. In contrast with this, Comparative Examples 1 to 3 fall outside the scope of the invention; that is, there were subjected to the impregnating treatment, castor oil alone having an iodine value of less than 90 in Comparative Example 1, a mixture comprising olive oil having an iodine value of less than 90 and the oxidative polymerization catalyst (cobalt naphthenate) in Comparative Example 2, and a mixture comprising olive oil having an iodine value of less than 90 and the photosensitizer (4,4'-bis(diethylamino) benzophenone) in Comparative Example 3. Lines drawn with the pencil leads prepared in the comparative examples could easily be erased with an eraser as was the case with lines drawn with conventional pencil leads.

Summarized in Table 2 are the results obtained by further evaluating the preservabilities of the lines drawn with the pencil leads prepared in Examples 1 to 6 in which the objects of the present invention can be achieved.

The impregnating treatments tested included china wood oil alone having an iodine value of 150 or more in Example 1, a mixture (mixing ratio 1:1) comprising octadecatrienoic acid and α-eleostearic acid each having an iodine value of 270 in Example 2, a mixture comprising dehydrated castor oil having an iodine value of 140 or more, china wood oil having an iodine value of 150 or more and the antioxidant (dl-α-tocopherol) in Example 3, a mixture comprising dehydrated castor oil having an iodine value of 155 or more, china wood oil having an iodine value of 150 or more and the oxidative polymerization catalyst (cobalt naphthenate) in Example 4, a mixture comprising dehydrated castor oil having an iodine value of 155 or more, china wood oil having an iodine value of 150 or more and the photosensitizer (4,4'-bis(diethylamino)benzophenone) in Example 5, and a mixture comprising china wood oil having an iodine value of 150 or more, linseed oil having an iodine value of 170 or more and the antioxidant (dl-α-tocopherol) in Example 6. The non-erasing ratios of the lines drawn with the pencil leads prepared in Examples 1 to 6 were almost the same as those with the pencil leads prepared in Comparative Examples 1 to 3 until 6 hours passed but thereafter, the lines drawn with the pencil leads prepared in Examples 1 to 6 increased in the non-erasing ratios against an eraser as time passed, and the non-erasing ratios thereof were 15 to 20 times as large as those of the lines drawn with the pencil leads prepared in Comparative Examples 1 to 3 after 3 weeks passed.

Further, it has been found from the preservabilities summarized in Table 2 that the pencil leads to which the antioxidant (dl-α-tocopherol) was added in Example 3 and Example 6 further improved in the preservability as compared with that of the pencil leads to which the antioxidant was not added in Examples 1, 2, 4 and 5.

Further, it has been found that the pencil leads to which the oxidative polymerization catalyst (cobalt naphthenate) and the photosensitizer (4,4'-bis(diethylamino) benzophenone) were added in Examples 4 and 5 increased by 1.5 to 3 times in the non-erasing ratios after 24 hours as compared with those of the pencil leads to which the oxidative polymerization catalyst and the photosensitizer were not added in Examples 1 and 2, and that they have shorter times of for developing non-erasability.

Furthermore, it has been found in comparison of Example 1 with Comparative Example 1, Example 4 with Comparative Example 2, and Example 5 with Comparative Example 3 that the intended non-erasable pencil leads can be obtained by adding only the unsaturated compound of the present invention having an iodine value of 130 or more, or by adding the antioxidant, the oxidative polymerization catalyst and the photosensitizer as well as the above unsaturated compound. As is apparent from the results obtained in Comparative Examples 1 to 3, the non-erasable pencil leads cannot be obtained merely by adding the unsaturated compound having an iodine value of less than 130 alone, or the oxidative polymerization catalyst and the photosensitizer together with said unsaturated compound.

What is claimed is:

1. A non-erasable baked pencil lead containing pores wherein the improvement comprises impregnating the pores of the lead with an unsaturated compound which contains an unsaturated group having an iodine value of at least 130 and to which an antioxidant is added.

2. A non-erasable baked pencil lead containing pores wherein the improvement comprises impregnating the pores of the lead with an unsaturated compound which contains an unsaturated group having an iodine value of at least 130, to which an antioxidant is added, and which comprises at least one compound selected from the group consisting of an unsaturated fatty acid; an unsaturated fatty acid ester; an unsaturated fatty acid glyceride; natural drying oils which contain a plurality of unsaturated fatty acids, esters and glycerides thereof; and synthetic drying oils selected from the group consisting of a fractional drying oil, a copolymerized drying oil, a polyhydric alcohol fatty acid ester, dehydrated castor oil, a dehydrated castor oil fatty acid and a conjugate isomerized oil.

3. A non-erasable baked pencil lead containing pores wherein the improvement comprises impregnating the pores of the lead with an unsaturated compound which contains an unsaturated group having an iodine value of at least 130 and to which an antioxidant is added in an amount of 0.0001 to 1 weight part per 100 weight parts of said unsaturated compound.

4. A non-erasable baked pencil lead containing pores wherein the improvement comprises impregnating the pores of the lead with an unsaturated compound which contains an unsaturated group having an iodine value of at least 130, to which an antioxidant is added in an amount of 0.0001 to 1 weight part per 100 weight parts of said unsaturated compound, and which comprises at least one compound selected from the group consisting of an unsaturated fatty acid; an unsaturated fatty acid ester; an unsaturated fatty acid glyceride; natural drying oils which contain a plurality of the unsaturated fatty acids, esters and glycerides thereof; and synthetic drying oils selected from the group consisting of a fractional drying oil, a copolymerized drying oil, a polyhydric alcohol fatty acid ester, dehydrated castor oil, a dehydrated castor oil fatty acid and a conjugate isomerized oil.

5. A non-erasable baked pencil lead containing pores wherein the improvement comprises impregnating the pores of the lead with an unsaturated compound which contains an unsaturated group having an iodine value of at least 130 and to which an antioxidant and an oxidative polymerization catalyst are added.

6. A non-erasable baked pencil lead containing pores wherein the improvement comprises impregnating the pores of the lead with an unsaturated compound which contains an unsaturated group having an iodine value of at least 130, to which an antioxidant and an oxidative polymerization catalyst are added, and which comprises at least one compound selected form the group consisting of an unsaturated fatty acid; an unsaturated fatty acid ester; an unsaturated fatty acid glyceride; natural drying oils which contain a plurality of unsaturated fatty acids, esters and glycerides thereof; and synthetic drying oils selected from the group consisting of a fractional drying oil, a copolymerized drying oil, a polyhydric alcohol fatty acid ester, dehydrated castor oil, a dehydrated castor oil, a dehydrated castor oil fatty acid and a conjugate isomerized oil.

7. A non-erasable baked pencil lead containing pores wherein the improvement comprises impregnating the pores of the lead with an unsaturated compound which contains an unsaturated group having an iodine value of at least 130, to which an antioxidant is added, and to which an oxidative polymerization catalyst is added in an amount of 0.001 to 1 weight part per 100 weight parts of said unsaturated compound.

8. A non-erasable baked pencil lead containing pores wherein the improvement comprises impregnating the pores of the lead with an unsaturated compound which contains an unsaturated group having an iodine value of at least 130, to which an antioxidant is added, and to which an oxidative polymerization catalyst is added in an amount of 0.001 to 1 weight part per 100 weight parts of said unsaturated compound, and which comprises at least one compound selected form the group consisting of an unsaturated fatty acid; an unsaturated fatty acid ester; an unsaturated fatty acid glyceride; natural drying oils which contain a plurality of unsaturated fatty acids, esters and glycerides thereof; and synthetic drying oils selected from the group consisting of a fractional drying oil, a copolymerized drying oil, a polyhydric alcohol fatty acid ester, dehydrated castor oil, a dehydrated castor oil, a dehydrated castor oil fatty acid and a conjugate isomerized oil.

9. A non-erasable baked pencil lead containing pores wherein the improvement comprises impregnating the pores of the lead with an unsaturated compound which contains an unsaturated group having an iodine value of at least 130, to which an antioxidant and a photosensitizer absorbing near visible rays and near UV rays are added.

10. A non-erasable baked pencil lead containing pores wherein the improvement comprises impregnating the pores of the lead with an unsaturated compound which contains an unsaturated group having an iodine value of at least 130, to which an antioxidant and a photosensitizer absorbing near visible rays and near UV rays are added, and which comprises at least one compound selected form the group consisting of an unsaturated fatty acid; an unsaturated fatty acid ester; an unsaturated fatty acid glyceride; natural drying oils which contain a plurality of unsaturated fatty acids, esters and glycerides thereof; and synthetic drying oils selected from the group consisting of a fractional drying oil, a copolymerized drying oil, a polyhydric alcohol fatty acid ester, dehydrated castor oil, a dehydrated castor oil, a dehydrated castor oil fatty acid and a conjugate isomerized oil.

11. A non-erasable baked pencil lead containing pores wherein the improvement comprises impregnating the pores of the lead with an unsaturated compound which contains an unsaturated group having an iodine value of at least 130, to which an antioxidant is added, and to which a photosensitizer absorbing near visible rays and near UV rays is added in an amount of 0.01 to 20 weight parts per 100 weight parts of said unsaturated compound.

12. A non-erasable baked pencil lead containing pores wherein the improvement comprises impregnating the pores of the lead with an unsaturated compound which contains an unsaturated group having an iodine value of at least 130, to which an antioxidant is added, and to which a photosensitizer absorbing near visible rays and near UV rays is added in an amount of 0.01 to 20 weight parts per 100 weight parts of said unsaturated compound, and which comprises at least one compound selected form the group consisting of an unsaturated fatty acid; an unsaturated fatty acid ester; an unsaturated fatty acid glyceride; natural drying oils which contain a plurality of unsaturated fatty acids, esters and glycerides thereof; and synthetic drying oils selected from the group consisting of a fractional drying oil, a copolymerized drying oil, a polyhydric alcohol fatty acid ester, dehydrated castor oil, a dehydrated castor oil, a dehydrated castor oil fatty acid and a conjugate isomerized oil.

* * * * *